United States Patent [19]

McNiel

[11] 4,438,687
[45] Mar. 27, 1984

[54] TRIPHAMMER NUTCRACKER

[76] Inventor: Fred A. McNiel, 611 Bouldin Ave., Austin, Tex. 78074

[21] Appl. No.: 404,001

[22] Filed: Aug. 2, 1982

[51] Int. Cl.³ .............................................. A23N 5/00
[52] U.S. Cl. ........................................ 99/571; 99/572; 99/578; 99/579; 99/580
[58] Field of Search .......................... 99/568, 571–573, 99/577–579, 580, 581–583

[56] References Cited

U.S. PATENT DOCUMENTS

| | | |
|---|---|---|
| 1,555,518 | 9/1925 | Ramey . |
| 2,783,802 | 3/1957 | Fontaine . |
| 3,159,194 | 12/1964 | Anderson ............................. 99/573 |
| 3,477,487 | 11/1969 | Holt . |
| 3,524,486 | 8/1970 | Turner . |
| 3,621,898 | 11/1971 | Turner . |
| 3,713,468 | 1/1973 | Walsh ................................... 99/580 |
| 3,841,212 | 10/1974 | Powell ................................. 99/571 |
| 3,858,501 | 1/1975 | Pfeiffer ................................ 99/571 |

Primary Examiner—Timothy F. Simone
Attorney, Agent, or Firm—Jones, Tullar & Cooper

[57] ABSTRACT

A triphammer nutcracker for use in fracturing the shells of various nuts of differing sizes and shell textures is disclosed. An operating handle is raised and lowered in a pumplike manner to provide access to a cracking chamber wherein the nut to be cracked is placed, to slide a shield completely around the cracking chamber, and to retract and release a spring biased hammer which strikes a pestle with sufficient force to drive the pestle toward the mortar thereby cracking the nut held therebetween. The broken shell fragments fall into a catch basin and any remaining shell and the nut meat fall into the catch basin as the next operating cycle is started. The nutcracker is structured in a manner such that the hammer will not be released to crack the nut until the shield is in place to enclose the cracking chamber thereby preventing flying nut fragments.

23 Claims, 6 Drawing Figures

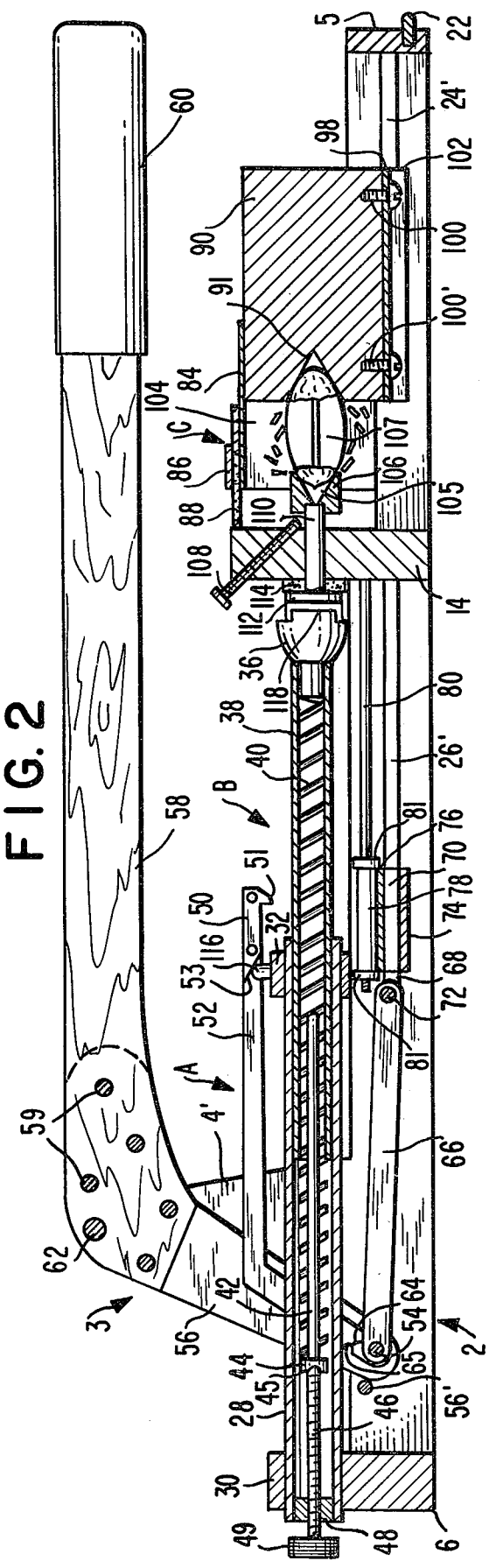
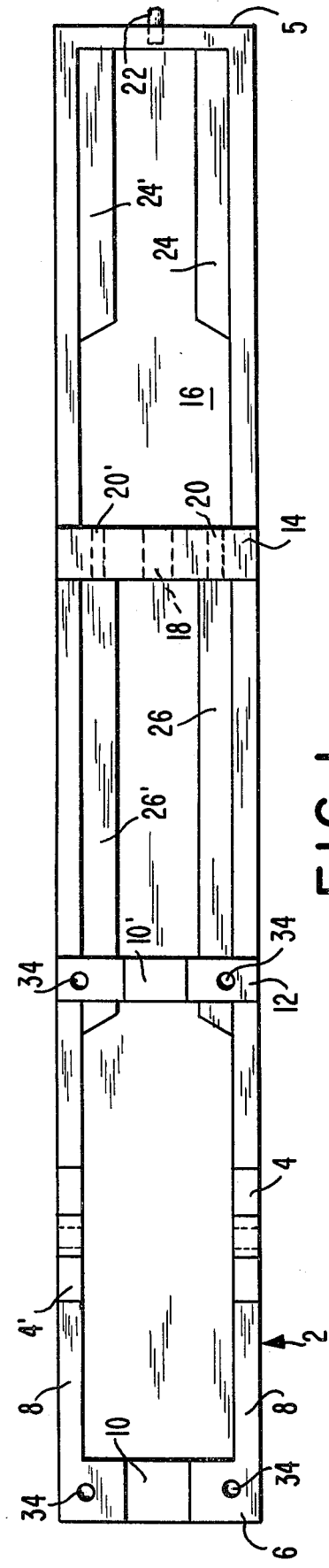
FIG. 2
FIG. 1

TRIPHAMMER NUTCRACKER

FIELD OF THE INVENTION

The present invention is directed generally to a nutcracker. More particularly, the present invention is directed to a hand operated nutcracker of the mortar and pestle type. Most specifically, the present invention is directed to a triphammer actuated mortar and pestle nutcracker usable to crack nuts of varying sizes with shells of varying textures. A hand lever portion of the nutcracker is initially raised in a pumplike stroke to separate the mortar and pestle so that a nut in its shell can be placed in a cracking chamber formed between the mortar and pestle. Lowering of the handle moves the mortar and pestle together to firmly engage the nut; closes a shield over cracking chamber; retracts a spring biased triphammer; and then releases the hammer which contacts the pestle with sufficient force to break the nut shell without fracturing the nut meat. The broken shell fragments fall into a catch basin or storage chamber and any remaining pieces of shell and the nut meat fall into the catch basin as the handle is raised to initiate a subsequent cycle of operation. The force exerted on the pestle by the triphammer is quickly and easily adjusted to accomodate for the size and toughness of the nut shell being cracked.

DESCRIPTION OF THE PRIOR ART

The use of mortar and pestle type nutcrackers is known generally in the art as may be seen in the following U.S. Pat. application Nos.; 1,555,518; 2,783,802; 3,477,487; 3,524,486; 3,621,898; 3,841,212; and 3,858,501. While these patents are not meant to be a complete listing of mortar and pestle or hammer and anvil types of nutcrackers, they are exemplary of the various nutcrackers known in the art. All operate on the general principle of placing a nut which is to be cracked between two supports that are then urged together to fracture the nut shell. While these and other nutcrackers presently available perform their intended function of cracking the shell of the nut, they have various drawbacks which render them less than completely satisfactory.

The nutcrackers which are presently available are often difficult to hold in place during use. Some require the use of a clamp for securement to a working surface such as a table and others must be permanently attached to the working surface so that they are not portable. These prior devices are also often complicated to operate and require various pushing, pulling and twisting motions of the operator. Thus, they can be difficult and may even be dangerous to use.

After the prior art nutcrackers have been secured in place and are being operated in a manner which often requires the use of both hands, they frequently create a danger of flying shell and nut meat fragments which could possibly injure the eye of the user and also create a problem of litter as the shell and meat fragments are thrown out by the impact. Similarly, as the movable elements are separated, the shell and meat fragments fall out onto the working surface and create further litter.

It is often not possible to adjust the striking force in the prior art nutcrackers to that the nut shell is either struck with too little force to break the shell or is struck with so much force that not only is the shell broken but the meat is also broken into a number of little pieces which are not as appealing as unbroken nut meat.

A further drawback of presently available nutcrackers is their slowness of operation. The hand operated devices cannot be rapidly cycled and the power operated devices, which are usually driven by an electric motor, are likewise slow in operation and are treated more as a novelty than as an operative, functional device. Thus, the presently available devices do not operate rapidly enough to render them satisfactory.

While all the presently available nutcrackers of the type generally similar to the subject invention do crack nuts, they are often difficult to secure and operate, do not completely prevent flying shell fragments and litter, are not adjustable in response to differing shell sizes and toughness, require complex operating assemblies and are time consuming and difficult to use.

SUMMARY OF THE INVENTION

It is an object of the present invention to provide a nutcracker which is simple to use.

Another object of the present invention is to provide a nutcracker which accomplishes the cracking operation by raising and lowering a hand lever.

A further object of the present invention is to provide a nutcracker which is readily adjustable to satisfactorily crack nuts of varying sizes and shell textures.

Yet another object of the present invention is to provide a nutcracker in which the cracking chamber is completely enclosed during the cracking operation.

A still further object of the present invention is to provide a nutcracker which does not require any means of anchoring or securing the unit to a work surface.

As will be set forth in greater detail in the description of the preferred embodiment, the triphammer nutcracker in accordance with the present invention is operated by the simple motion of raising and lowering a handle in a pump-like manner. As the handle is raised, the mortar and a sliding cover shield are moved to allow a nut to be placed in the cracking chamber. Once the nut has been placed in position, the handle is lowered thus initially causing the mortar and pestle to grasp the nut. Further lowering of the handle moves the sliding shield into place about the cracking chamber and retracts a spring biased triphammer. As the handle is completely lowered, the hammer is released and strikes the pestle with sufficient force to break the nut shell without damaging the nut meat. The shell fragments fall into a catch basin into which the nut meat also falls as the handle is raised to start the next cracking cycle.

The triphammer nutcracker assembly and base in accordance with the present invention sits on a support which carries the catch basin for the broken shells and nut meat. This base is preferably provided with resilient pads or feet so that it can be placed on a work surface such as a table. Since the pump type handle is easily raised and lowered, the nutcracker will remain in place without the use of special clamps or securement means.

The cracking chamber is completely shielded before the triphammer is released so that when the nut shell is broken, any shell fragment will be retained within the cracking chamber and will fall into the catch basin. Similarly, as the mortar and pestle are separated to start a new cycle, the nut cracked in the previous cycle will fall into the catch base. The sliding shield thus reduces litter and also prevents any possible damage which might be caused by flying shell fragments.

The force applied to the nut in the cracking chamber is quickly adjustable by two separate means to insure that only the force required to break the shell and not so much force that the nut meat will be broken is applied. One adjusting means varies the spring force applied to the triphammer while the second adjusting means limits the movement of the pestle. Together these adjustments allow the application of only that amount of force required to crack and break the nut shell without destroying the nut meat.

The triphammer nutcracker in accordance with the present invention is easy to operate, has adjusting means to vary the cracking force, is safe and clean since shell fragments are not allowed to fly about, is fast and efficient, and is generally more convenient and functional than prior art devices.

BRIEF DESCRIPTION OF THE DRAWINGS

While the patentable features of the triphammer nutcracker in accordance with the present invention are set forth with particularity in the appended claims, a full and complete understanding of the structure and operation of the present invention may be had by referring to the description of a preferred embodiment, as set forth hereinafter, and as may be seen in the accompanying drawings in which:

FIG. 1 is a top plan view of the base of the triphammer nutcracker in accordance with the present invention;

FIG. 2 is a side elevation view, partly in section, of the base with the triphammer nutcracker in accordance with the present invention secured in place on the base;

DESCRIPTION OF THE PREFERRED EMBODIMENT

Figure 3:
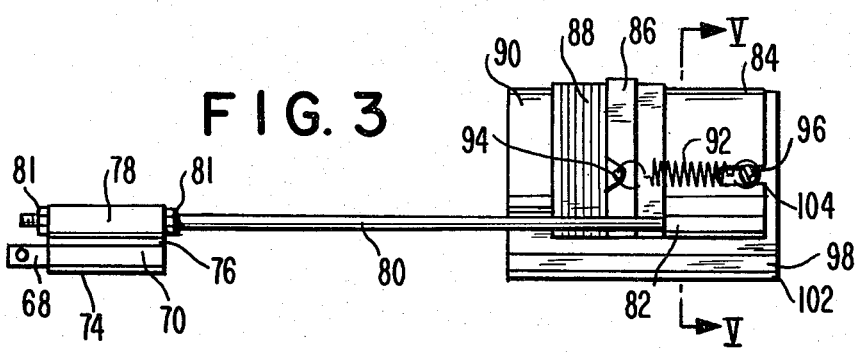
FIG. 3 is a side elevation view of the shield and mortar portion of the subject invention together with the shield sliding block assembly.

Referring initially to FIG. 1, there may be seen generally at 2 a base for triphammer nutcracker in accordance with the present invention. Base 2 is generally rectangular and is comprised of spaced side walls 8, a first end wall 5, a second end wall 6, and spaced transverse cross-bars 12 and 14. Extending upwardly from side walls 8 intermediate end wall 6 and cross-bar 12 are a pair of clevis arms 4 and 4' whose function will be discussed hereinafter.

Turning now to FIG. 2, there may be seen, generally at 3, the triphammer nutcracker in accordance with the present invention secured on base 2. Triphammer nutcracker 3 is comprised generally of three component groups; a handle and actuating arm group A; a triphammer assembly B; and a mortar, pestle and shield assembly C. Triphammer nutcracker 3 is secured to base 2 by positioning an outer casing 28 of the triphammer group B in correspondingly shaped semi-circular recesses 10 and 10' in end wall 6 and intermediate cross bar 12, respectively of base 2. Complimentarily shaped caps 30 and 32 are placed over the outer casing 28 and are held by suitable means such as screws (not shown) which are threaded into tapped holes 34 in end wall 6 and crossbar 12.

A hammer head 36 is securely affixed to one end of a working barrel 38 which telescopes within outer casing 28. A coil compression spring 40 is carried within working barrel 38 and outer casing 28 and operates to bias hammer head 36 and barrel 38 out of casing 28. The spring force is readily adjustable by the use of a tension adjusting rod 42 which is positioned within spring 40. Rod 42 includes a flanged head 44 which engages the end of compression spring 40 opposite the hammer head 36 end. Flanged head 44 includes a recess 45 which receives a first end of a tension adjusting screw 46 that is threaded through a tapped end plug 48 carried at the outer end of outer casing 28. A knurled head 49 is provided on the second end of tension adjusting screw 46 whereby compression of spring 40 can be readily adjusted by rotation of head 49.

A pair of clevis plates 56 are secured to clevis arms 4 and 4' by a suitable hinge pin 62 which passes through holes in plates 56 and clevis arms 4 and 4'. Clevis plates 56 are spaced from each other and pass downwardly at one end on either side of outer casing 28. An operating lever handle 58 is secured between the two clevis plates and may carry a suitable hand grip 60 at its free end. Securement of handle 58 to clevis plates 56 may be accomplished in any suitable manner such as by screws, bolts or rivets, shown generally at 59.

A pawl head 50 which carries a downwardly extending pawl tip 51 at a first end, is carried between first ends of generally L-shaped pawl rods 52. The second ends of pawl rods 52 are joined to the free ends of clevis plates 56 by a hinge pin 54. These pawl rods also straddle outer casing 28 of the triphammer assembly B and move as the handle 58 is raised and lowered. A torsion spring 64 is placed around hinge pin 54 with its free end being retained in a notch 65 in the second end of pawl rods 52. The second end 53 of pawl head 50 is an inclined camming surface, as may be seen in FIG. 2 and engages a camming pin 116 carried on the top of cap 32. Briefly, in operation as handle 58 is raised, pawl rods 52 move to the right, as seen in FIG. 2 until pawl tip 51 engages a recess in hammer head 36. When handle 58 is lowered, pawl rods 52 move the hammer head 36 and working barrel 38 to the left compressing spring 40. Camming surface 53 of pawl head 50 slides up camming pin 116, and the pawl head 50 is raised to release the hammer head 36 so that head 36 will move rapidly to the right under the influence of spring 40.

As may also be seen in FIG. 2, a pitman bar 66 is also carries at a first end by hinge pin 54 between clevis plates 56. The second end of pitman bar 66 is secured to shield slide block arms 68, which extend to the left from a body portion of slide block 70, by hinge pin 72. This slide block 70 can be seen more clearly in FIGS. 3 and 4 and, as shown most clearly in FIG. 4, carries a lower plate 74 and an upper plate 76. These plates 74 and 76, in combination with slide block 70 define a generally grooved slide block which slides on spaced inwardly extending slide block track fins or ribs 26 and 26'. Fins 26 and 26', as may be seen most clearly in FIG. 1, extend inwardly from the side walls 8 of base 2 generally between cross-bars 12 and 14. Hence, as handle 58 is raised, pitman bar 66 causes slide block 70 to move to the right and to return to the left as handle 58 is lowered. The cooperation of lower and upper plates 74 and 76 with fins 26 allows slide block 70 to move solely in a rectilinear manner.

Figure 4:
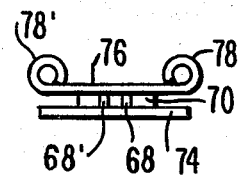
FIG. 4 is an end view of the shield sliding block assembly.
Figure 5:
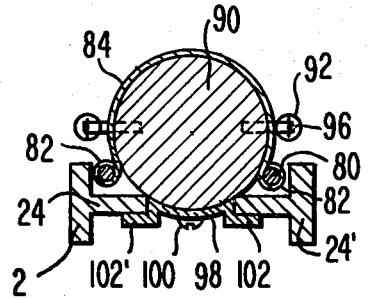
FIG. 5 is a sectional view of the shield and mortar assembly taken along line V—V in FIG. 3.

A pair of push rods 80 extend from sliding block 70 through holes 20 and 20' in cross-bar 14 and are secured to mortar and shield assembly C, as may be seen in FIGS. 2 and 3. Upper plate 76 of sliding block 70 carries rolled sleeves 78 and 78' at its outer ends. First ends of push rods 80 pass through these sleeves and are secured thereto by suitable nuts 81 which engage threads provided on push rods 80. The second ends of push rods 80 are retained in closed ended sleeves 82 which may be seen in FIGS. 3 and 5. These sleeves are formed by rolling the lower edges of a sliding shield 84 which, as is shown most clearly in FIGS. 2, 3, and 5 is slideably carries by mortar 90. Sliding shield 84 further includes an outer flange 86 at its leading edge with a resilient bonnet 88 being secured in flange 86 and extending to the left of sliding shield 84, as seen in FIGS. 2 and 3.

As is seen most clearly in FIG. 2, mortar 90 has a conical recess 91 in its face portion and this recess cooperates with a similar recess 105 in pestle 106 to hold a nut 107 which is to be cracked by the triphammer nutcracker of the present invention. Sliding shield 84 and resilient bonnet 88 surround the cracking chamber 109 defined as the space between the mortar 90 and pestle 106. During cracking of the nut, the sliding shield 84 and resilient bonnet completely enclose the cracking chamber 109 to prevent any shell or nut meat fragments from being thrown about.

Referring again to FIGS. 3 and 5, sliding shield 84 is attached to mortar 90 by a pair of coil springs 92 which are secured at a first end to shackles 94 formed on flange 86 and at a second end to pins 96 which extend outwardly from mortar 90, as shown most clearly in FIG. 5. Sliding shield 84 is further provided with elongated slots 104 that cooperate with pins 96 to allow sliding shield 84 to move linearly along mortar 90 without rotating.

Mortar 90 further carries a generally U-shaped plate 98 on its lower surface, as may be seen in FIG. 5. U-shaped plate 98 also includes downwardly and outwardly extending plates 102 which, as may be seen most clearly in FIG. 5 define grooves that engage mortar slide fins 24 and 24' that extend inwardly from side walls 8 of base 2 in a manner similar to fins 26. Thus mortar 90 can slide in a rectilinear manner as operating lever 58 is raised and lowered through the cooperation of clevis plates 56, pitman bar 66, slide block 70, and push rods 80.

Returning again to FIG. 2, pestle 106 is carried at a first end of a pestle drive rod 110 which is, in turn, slideably positioned within aperture 18 that extends through cross-bar 14. Pestle drive rod 110 carries a pestle drive disc 112 at its second end on the opposite side of cross-bar 18. A shock absorbing washer 114 is placed between pestle drive disc 112 and cross-bar 18. The face of hammer 36 which strikes pestle drive disc 112 is preferably covered with a somewhat resilient end cap 118 which prevents marring of the face of hammer 36 or pestle drive disc 112 and which also reduces the noise of impact when hammer head 36 strikes pestle drive disk 112. A pestle adjusting screw 108 is threaded through cross-bar 14 and contacts the rear surface of pestle 106 so that the spacing of pestle 106 and mortar 90 from each other can be adjusted to accomodate for various sized nuts.

Figure 6:
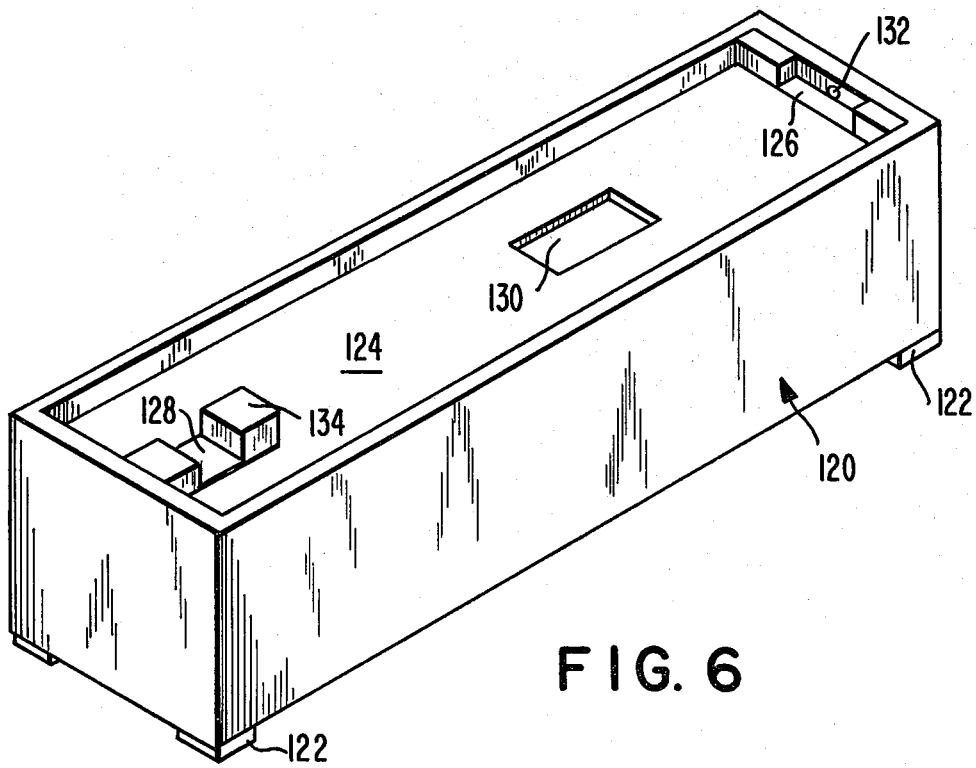
FIG. 6 is a perspective view of the support, catchbasin, and storage box for the triphammer nutcracker in accordance with the present invention.

A combination support, catch basin, and storage case for the triphammer nutcracker of the present invention is shown in FIG. 6 generally at 120. Support 120 is generally a rectangular box having resilient support pads or feet 122 at the lower four corners so that support 120 can be placed on any level surface such as a table where it will remain in place and will not mar the surface. A cover portion 124 of the support 120 is removeably attached to the support 120 and is provided with an opening 130 which underlies the cracking chamber 109 when the triphammer nutcracker 3 is placed on support 120. Shell fragments and nut meat fall through opening 130 where they are stored until the cover 124 is removed. A generally U-shaped cut-out 126 is provided at a first end of cover 124 and a dowel pin socket 132 is located in the end wall of support 120 adjacent U-shaped cut-out 126. A stabilizing lug 134 extends upwardly from cover 124 adjacent its end opposite U-shaped cut-out 126 and cooperates with the adjacent end wall of support 120 to provide a frame seat 128. The nutcracker 3 and base 2 are secured to support 120 by initially placing end wall 5 of base 2 into U-shaped cut-out 126 and sliding base 2 until a dowel pin 22 on base 2 is received in socket 132. Base end wall 6 can then be lowered into frame seat 128 and is held by stabilizing lug 134. When the triphammer nutcracker 3 is not being used, the tension adjusting screw 46 can be removed to reduce overall length and to relieve the tension on spring 40. The nutcracker can then be placed within support 120 and cover 124 can be replaced to provide a neat and compact unit for storage.

In operation, triphammer nutcracker 3 is placed on support 120 and hand grip 60 is grasped. Lever 58 is raised in a pump-like fashion. Upward motion of lever 58 causes pawl rods 52 to move to the right, as seen in FIG. 2 until pawl tip 51 drops behind hammer head 36 into the provided recess. Simultaneously, pitman bar 66 moves to the right and causes sliding block 70 to slide to the right along fins 26 and 26'. This movement of sliding block 70 causes push rods 80 to also move to the right thereby sliding shield 84 to the right until pins 96 on mortar 90 seat in ends of slots 104 in shield 84. Shield 84 and mortar 90 continue to move to the right as mortar 90 slides on fins 24 and 24'. At this point when handle 58 has been fully raised, a nut can be placed in cracking chamber 109 and is held in place between the cone shaped recesses 91 and 105 in mortar 90 and pestle 106, respectively. The space between the mortar and pestle can be adjusted by turning pestle adjusting screw 108. Upward travel of handle 58 is stopped when sliding block 70 abuts the wall of cross bar 14. Handle 58 can now be lowered thereby moving sliding block 70 to the left. This initially moves mortar 90 to the left to firmly grasp the nut. Further lowering of handle 58 pulls sliding shield 84 and resilient bonnet 88 to the left against the tension of springs 92 to cover the cracking chamber 109 and to bias the mortar 90 against the nut. This spring force also ensures that pestle 106 is drawn against pestle adjusting screw 108 and forces pestle drive disc 112 away from the wall of cross-bar 14. At the same time, the pawl rods 52 are also moving to the left to retract working barrel 38 into outer casing 28 thus compressing spring 40 and moving the hammer 36 away from pestle drive disc 112. As handle 58 is fully lowered to the position shown in FIG. 2, such downward handle travel being limited by stop pin 56', the camming surface 53 on pawl head 50 is raised by camming pin 116 to release the hammer 36 which is projected by spring 40 into contact with pestle drive disc 112 to drive pestle 106 to the right so that the shell of nut 107 will be broken. Any broken nut shell fragments fall through the bottom of base 2 and through opening 130 in cover 124 into the catch basin formed by support 120. As the handle 58 is raised to start another cycle, the nut meat and any remaining shell is released from between mortar 90 and pestle 106 and also falls into the catch basin. Another nut can now be placed in cracking chamber 109 and the cycle repeated. It should be noted that the lengths of the pawl rods 52 and the pitman bar 66 are selected so that the hammer 26 cannot be released from its retracted position until the sliding shield 84 and the resilient bonnet 88 are completely enclosing the cracking chamber 109. This prevents shell fragments from flying about and further reduces the possibility of the operator placing his fingers in the cracking chamber 109 during cracking of the nut.

As was previously alluded to, the force imparted to pestle 106 by hammer 36 can be varied by movement of tension adjusting screw 46. This adjustable striking force is desirable since the texture and thickness of the nut shell varies with the type of nut and it is desirable to impart only that force required to break the nut shell while not fragmenting the nut meat. Pestle adjusting screw 108 also can be used to adjust the position of the pestle 106 and hence the distance that the hammer 26 will travel before striking pestle drive disc 112. These two adjusting means allow the triphammer nutcracker in accordance with the present invention to be adjusted for satisfactory operation with a wide variety of nuts of differing sizes and textures.

While a preferred embodiment of a triphammer nutcracker in accordance with the present invention has been fully and completely described hereinabove, it will be obvious to one of skill in the art that a number of changes in, for example, the materials used, the specific shapes of the mortar, sliding shield and pestle; the types of springs used; the specific shape of the handle; and the like could be made without departing from the true spirit and scope of the invention and that the invention is to be limited only by the following claims.

I claim:

1. A triphammer nutcracker comprising:
    a base;
    a mortar and pestle slideably carried on said base for rectilinear motion with respect to each other, said mortar and said pestle being spaced from each other to define a cracking chamber and each having a recess in a face portion, said recesses cooperating to receive and hold a nut to be cracked in said cracking chamber between said mortar and said pestle;
    a triphammer having a hammer head which is spring biased toward said pestle and which forcibly contacts said pestle to effect cracking of the nut positioned in said cracking chamber, said hammer head being slideably carried on said base for movement toward and away from said pestle;
    a slideable cracking chamber shield telescopingly surrounding said mortar and being slideable with respect thereto to enclose said cracking chamber during cracking of the nut;
    an operating lever having means to retract said hammer head away from said pestle and to release said hammer head to cause said hammer head to forcibly contact said pestle, and means to reciprocate said mortar and said shield to hold the nut and to enclose said cracking chamber during cracking of the nut; and
    means to adjust said spring bias of said triphammer and means to adjust the distance of travel of said pestle in said base to regulate the cracking force applied to the nut by said pestle.

2. The nutcracker of claim 1 wherein said base is generally rectangular and includes a first end wall, a second end wall, spaced side walls, and spaced first and second transverse cross-bars extending between said side walls.

3. The nutcracker of claim 2 wherein said pestle includes a pestle drive rod which is slideably supported in, and extends through said second cross-bar.

4. The nutcracker of claim 3 wherein said pestle further includes a pestle drive disc secured to said pestle drive rod.

5. The nutcracker of claim 3 wherein a pestle adjusting screw is threadably carried in said second cross bar.

6. The nutcracker of claim 2 wherein said mortar is slideably supported on mortar slide fins which extend inwardly from said side walls.

7. The nutcracker of claim 6 wherein said mortar further includes downwardly and outwardly extending plates which engage said slide fins to slideably secure said mortar to said base.

8. The nutcracker of claim 2 wherein said triphammer includes an outer support casing and a working barrel having first and second ends, said first end of said working barrel carrying said hammer head and said second end of said working barrel being telescopingly carried within said outer support casing, said outer support casing being secured in cooperatively shaped recesses in said second end wall and said first cross-bar.

9. The nutcracker of claim 8 wherein a compression spring is carried within said outer casing and said working barrel.

10. The nutcracker of claim 9 wherein said compression spring tension is adjustable by a tension adjusting screw.

11. The nutcracker of claim 2 wherein said sliding shield includes a resilient bonnet at a first end thereof, said bonnet contacting said second cross bar when said shield encloses said cracking chamber.

12. The nutcracker assembly of claim 11 wherein said mortar includes spaced outwardly extending pins and further wherein said shield includes spaced slots, said pins sliding within said slots to restrict said motion of said shield on said mortar to rectilinear reciprocation.

13. The nutcracker of claim 12 wherein coil springs extend between said pins on said mortar and said shield to bias said shield to an open position which affords access to said cracking chamber.

14. The nutcracker of claim 2 wherein said operating lever handle is secured between spaced clevis plates, said clevis plates being rotatably secured to clevis arms extending upwardly from said side walls.

15. The nutcracker of claim 14 wherein said handle is movable with respect to said base in an up and down, pump-like motion.

16. The nutcracker of claim 14 wherein spaced pawl rods are secured to said clevis plates.

17. The nutcracker of claim 16 wherein a pawl head is secured between free ends of said pawl rods, said pawl head including a pawl tip which engages said hammer head, and a pawl camming surface.

18. The nutcracker of claim 17 wherein a camming pin is secured to said first cross-bar and contacts said pawl camming surface to release said hammer head when said operating lever handle has been lowered.

19. The nutcracker of claim 14 further wherein a pitman bar is secured at a first end between said clevis plates, said pitman bar being secured at a second end a shield sliding block.

20. The nutcracker of claim 19 wherein said sliding block is slideable on slide block fins which extend inwardly from said side walls of said base.

21. The nutcracker of claim 19 wherein said shield sliding block carries a pair of shield push rods which extend between said sliding block and said shield.

22. The nutcracker of claim 21 wherein said shield is telescoped along said mortar to enclose said cracking chamber as said handle is lowered.

23. The nutcracker of claim 1 wherein said base is positionable on a support, said support including a catch basin which underlies said cracking chamber and receives shell framents and nut meat as the nut is cracked.

* * * * *